May 20, 1952   R. B. WOODBURY   2,597,214
PIP SELECTOR
Filed Nov. 30, 1945

INVENTOR
ROGER B. WOODBURY
BY M. O. Hayes

ATTORNEY

Patented May 20, 1952

2,597,214

UNITED STATES PATENT OFFICE 2,597,214

PIP SELECTOR

Roger B. Woodbury, Boston, Mass., assignor, by mesne assignments, to the United States of America as represented by the Secretary of the Navy Application November 30, 1945, Serial No. 631,954

15 Claims. (Cl. 250—27)

1

This invention relates to pip selector circuits particularly those of the phantastron type.

In long range navigation operation as disclosed in patent application Serial No. 599,163 filed June 13, 1945, of J. A. Pierce, D. E. Kerr, and J. C. Street, the "master" and "slave" signals are matched and the delay read by reference to 10, 50 and 500 microsecond timing marks. In this procedure it is necessary to interpolate between 10 microsecond marks, add 10 microsecond marks to the proper 50 microsecond mark, add 50 microsecond marks to the proper 500 microsecond mark, and then add 500 microsecond marks to the zero time reference. The total of these gives the time difference in microseconds. In simplifying this procedure it is desirable to select electronically the proper 500 microseconds mark out of the 40 such marks. The present invention performs this selection, utilizing a minimum of tubes and without electrically loading the range potentiometer circuit, which controls the selector.

Phantastron circuits (voltage sensitive delay networks producing a voltage wave varying linearly with time) are already known in the art. However, in the known types the voltage wave at the plate of the electron tube associated therewith begins at different points on the linear slope as determined by voltages fed thereto, and terminates at a fixed point. In the present invention, the voltage wave begins at a fixed voltage and terminates at a voltage determined by the voltages fed thereto.

It is an object of this invention to provide a pip selector circuit utilizing a minimum of tubes and which does not load the controlling potentiometer circuit.

It is a further object of this invention to provide a phantastron circuit whose voltage wave begins at a fixed voltage and terminates at a voltage determined by the voltages fed thereto.

These and other objects will be more apparent upon consideration of the following specification together with the accompanying drawing, in which.

Figure 1:
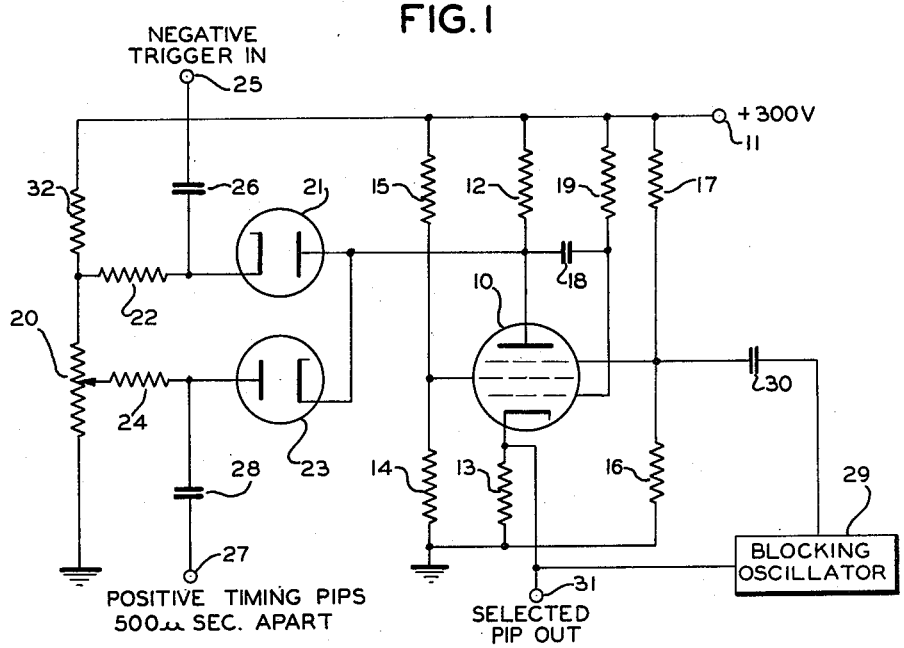
Fig. 1 is generally a circuit diagram of an embodiment of the invention.

In Fig. 1 a pentode electron tube 10 is disclosed having the customary cathode, grid, screen, suppressor, and plate. The grid designated as suppressor is of special type having a high transconductance to cut off plate current at a potential of −10 volts. A source of plate potential has its positive side connected with terminal 11 and its

2 negative side connected with ground. Plate resistor 12 of about 600 K. (600,000 ohms) resistance connects the positive side of this source with the plate of tube 10, while cathode resistor 13 of about 7.5 K. resistance connects the negative side of this source with the cathode of tube 10. A voltage divider, comprising resistors 14 and 15 maintains the screen of tube 10 at a substantially lower potential than the positive side of the source. With a 6AS6 pentode tube values of resistors 14 and 15 of 20 K. and 21 K. respectively have been found satisfactorily, and maintain the screen of tube 10 at a potential approximately one third that of the positive side of the source when the plate of tube 10 is non-conducting. A second voltage divider, comprising resistors 16 and 17, maintains the suppressor of tube 10 at a potential slightly greater than the negative side of the source of plate potential. Values of resistors 16 and 17 of 20 K. and 390 K. respectively have been found satisfactory. A .01 u. f. capacitor 18 joins the plate and grid of tube 10, while a 3 megohm resistor 19 joints this grid with the positive side of the source of plate potential.

A potentiometer 20, which in the long range navigation system referred to above would control the delay in the "slave" station and which is known as the course delay potentiometer is connected across the source of plate potential through resistor 32. The plate of tube 10 is joined through diode 21 and isolating resistor 22 to a fixed point between potentiometer 20 and resistor 32. This plate is also joined through diode 23 and resistor 24 with the movable arm of potentiometer 20.

Figure 2:
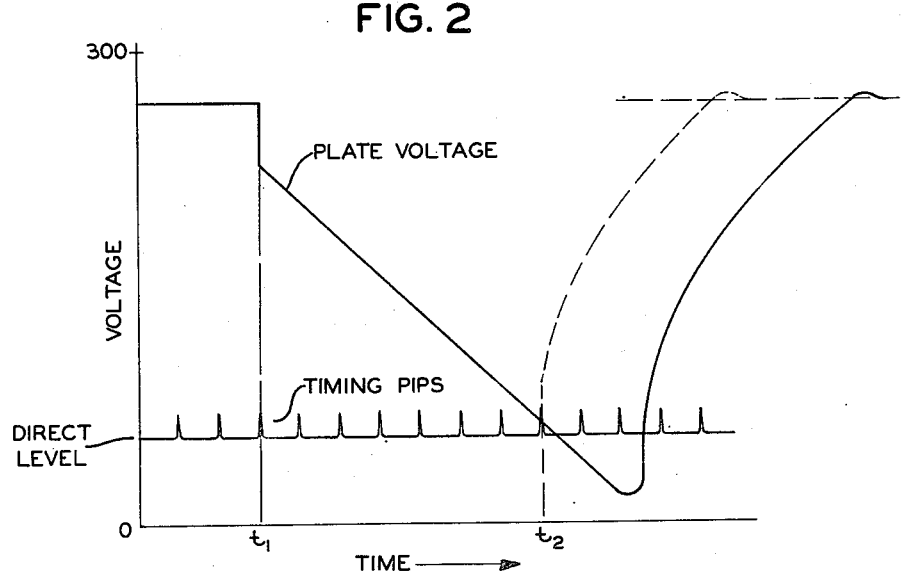
Fig. 2 is a diagram of certain waveforms occurring in this embodiment.

The operation of the circuit above described will now be considered in conjunction with the waveforms disclosed in Fig. 2. A series of negative triggers of a fixed repetition rate from any convenient source such as the voltage divider in the system of the above mentioned application is applied to terminal 25 and through peaking condenser 26 and diode 21, will reduce the voltage at the plate of diode 21 from a value somewhat less than that applied at terminal 11, it being noted that there is a voltage drop already existing across resistor 12 due to current flow therethrough and through diode 21. The waveform of the plate voltage of tube 10 is shown as a full line in Fig. 2, and if a trigger occurs at time $t_1$, the plate voltage will drop sharply as shown. Up to this time current has been flowing from the cathode of tube 10 to the screen, but no current has been flowing through to the plate. The suppressor grid due to its potential being only slightly above ground is negative with respect to the cathode to prevent current flow to the plate. When the plate voltage drops at time $t_1$, the grid voltage will also drop due to the presence of capacitor 18 to reduce the flow of current from cathode to screen with a resulting drop in cathode potential to a point where the suppressor is positive with respect to the cathode. Current flow to the plate now begins and the voltage drop is transmitted to the grid through capacitor 18. The result is a gradual dropping of the plate voltage as shown by the corresponding waveform in Fig. 2 after time $t_1$. Capacitor 18 will be discharging through resistor 19 during this period of dropping plate voltage, and this drop will be linear. This drop will continue until the plate voltage falls so low that it is not affected by a rise of grid voltage. The grid voltage then rises through resistor 19 and the cathode follows this until the suppressor is negative with respect to it. The plate current is then cut off by the suppressor. This terminates the linear descent and the plate voltage returns to its initial value as shown to repeat the linear cycle when the succeeding trigger is applied at terminal 25. The circuit in operation as described above may be used as a sweep generator, and would be particularly applicable where a linear sweep is desired.

In the instant embodiment the problem is to select or count the number of pips of a second series which have a much higher repetition rate but are synchronized in time with the negative triggers applied to terminal 25. The second series of pips are obtained from any desired source. In the long range navigation system referred to above, the pips would be the 500 microsecond marker pips from the frequency divider. The second series of pips are positive and are applied to terminal 27 and conveyed through diode 23 to the plate of tube 10 if the plate voltage of tube 10 is negative with respect to the plate of diode 23 at the time of the pip. When the plate of tube 10 is sufficiently negative in its linear descent, one of these pips will pass through diode 23 at time $t_2$ as shown in Fig. 2, and the grid voltage of tube 10 will be increased due to capacitor 18. This will increase the cathode potential to render the suppressor negative with respect to the cathode, and stop the flow of plate current. This will terminate the linear cycle and the plate voltage will return to its initial value as shown by the dotted line in the diagram in Fig. 2.

To insure sharp termination of the linear cycle, the positive pip which appears across cathode resistor 13 at the end of the linear cycle may be fed to the input of a blocking oscillator 29 which applies through a condenser 30 a negative output gate to the suppressor of tube 10. This insures substantially instantaneous termination of current flow to the plate of tube 10.

The movable arm of potentiometer 20 determines the direct voltage level and hence controls the level of the positive pips from terminal 27. The rectifying action of diode 23 prevents the positive pips from being applied to the plate of tube 10, until the absolute voltage of a pip exceeds the otherwise occurring plate voltage. Thus, the setting of the movable arm of potentiometer 20 determines the first pip to appear on the plate of tube 10 and hence the duration of the linear cycle. In order to count the number of pips occurring between time $t_1$ and $t_2$, it is only necessary to know the number of degrees of rotation of the linear potentiometer 20 and the potentiometer reading for zero pips. The number of pips for any setting may be then obtained by reading the rotation of the potentiometer.

An advantage of this circuit is that there is no loading of the potentiometer by the circuit, since the current drawn by the circuit through the range potentiometer is not a function of the range potentiometer setting. Furthermore, there are no non-linearities which result from the plate operating at low potentials. An additional advantage is that accuracy may be obtained with linear cycles of short duration, since it is not necessary to wait for phantastron operation to terminate before selecting a pip, it being easy to select even the first pip of a series. Tests indicate that the circuit is linear to better than .05% of full range.

The invention is only to be limited by the appended claims.

I claim:

1. A pip selector comprising, a pentode having a cathode, a grid, a screen, a suppressor, and a plate, a source of plate potential, a resistor connecting said plate with the positive side of said source, a resistor connecting said cathode with the negative side of said source, means maintaining said screen at a potential substantially less than the positive potential of said source, means maintaining said suppressor at a potential slightly higher than the negative potential of said source, a capacitor joining said plate and said grid, and a resistor connecting said grid with the positive side of said source, said capacitor transmitting a voltage drop at said plate to said grid to render said suppressor positive with respect to said cathode, said capacitor discharging through said last mentioned resistor to produce a linear drop in plate voltage with time.

2. A pip selector comprising, a pentode having a cathode, a grid, a screen, a suppressor, and a plate, a source of plate potential, a resistor connecting said plate with the positive side of said source of plate potential, a resistor connecting said cathode with the negative side of said source, a voltage divider maintaining said screen at a potential substantially less than the positive potential of said source, a voltage divider maintaining said suppressor at a potential slightly above the negative potential of said source, a capacitor joining said plate and grid, and a resistor connecting said grid with the positive side of said source, said capacitor transmitting a voltage drop at said plate to said grid to render said suppressor positive with respect to said cathode, said capacitor discharging through said last mentioned resistor to produce a linear drop in plate voltage with time.

3. A pip selector comprising, a pentode having a cathode, a grid, a screen, a suppressor, and a plate, a source of plate potential, a resistor connecting said plate with the positive side of said source of plate potential, a resistor connecting said cathode with the negative side of said source of plate potential, a voltage divider maintaining said screen at a potential substantially less than the positive side of said source, a voltage divider maintaining said suppressor at a potential slightly greater than the negative side of said source, a capacitor joining said plate and grid, a resistor joining said grid and the positive side of said source, a source of negative triggers and a source of positive pips of higher repetition rate than said negative triggers and synchronized therewith, diodes for transmitting said triggers and pips to the plate of said pentode, each of said negative triggers reducing the voltage at said plate and through said capacitor the voltage at said grid to render said suppressor positive with respect to said cathode, said capacitor discharging through said last mentioned resistor to produce a linear drop in plate voltage with time to a voltage less than one of said positive pips, said one positive pip then increasing through said capacitor the grid voltage to render said suppressor negative with respect to said cathode to terminate said linear drop in plate voltage.

4. The combination of claim 3 with a blocking oscillator having its input connected across said cathode resistor and its output connected to said suppressor whereby the positive pip produced across said cathode resistor at the end of said linear cycle will trigger said blocking oscillator to apply a negative gate on said suppressor to insure sharp termination of said linear cycle.

5. The combination of claim 3 with a potentiometer having its resistor connected through a second resistor across said source of plate potential, an isolating resistor joining the arm of said potentiometer with the diode transmitting said pips to determine the direct voltage level of said pips in response to the setting of said arm, whereby the duration of said linear cycle may be determined.

6. A phantastron circuit comprising, a pentode electron tube having an anode, a cathode, a control grid, a screen grid, and a suppressor grid, a source of anode supply potential, a resistor returning said anode to the positive side of said potential source, a resistor returning said cathode to the negative side of said potential source, means for maintaining said screen and suppressor grids at predetermined potentials, a capacitor connecting said anode and said control grid, and a resistor connecting said control grid to the positive side of said potential source.

7. A phantastron circuit comprising, an electron tube having at least an anode, a control grid, a suppressor grid, and a cathode, a source of potential, an impedance returning said anode to the positive side of said source, an impedance returning said cathode to the negative side of said source, means maintaining said suppressor grid at a fixed potential for normally preventing anode current flow and allowing current flow from said cathode to said suppressor grid, means responsive to a drop in anode potential for simultaneously rendering said control grid and said cathode relatively more negative for allowing anode current flow.

8. A pip selector comprising, a pentode having a cathode, a control grid, a screen grid, a suppressor grid, and a plate, a source of plate potential, a resistor connecting said plate with the positive side of said source of plate potential, a resistor connecting said cathode with the negative side of said source of plate potential, means maintaining said screen grid at a potential substantially less than that of the positive side of said source, means maintaining said suppressor grid at a potential slightly greater than that of the negative side of said source, a capacitor connected between said plate and said control grid, a resistor connected between said control grid and the positive side of said source, a source of negative triggers, a source of positive pips of higher repetition rate than said negative triggers and synchronized therewith, a resistor and a potentiometer serially connected across said anode potential source, first and second diodes, the anode of said first diode being connected directly to the anode of said pentode and the cathode of said second diode, a resistor connected between the cathode of said first diode and the junction of said serially connected potentiometer and resistor, a resistor connected between the output arm of said potentiometer and the anode of said second diode, means for coupling said negative triggers to said cathode of said first diode, and means for coupling said positive pips to the anode of said second diode.

9. An electron tube circuit comprising, an electron tube having at least an anode, a suppressor grid, a screen grid, a control grid and a cathode, a reference potential point, a source of potential positive with respect to said reference point, a load impedance coupling said anode to said positive potential source, a load impedance connecting said cathode to said reference point, means for biasing said suppressor and screen grids to normally allow screen grid current flow, said potential at said cathode by virtue of the screen grid current flow through said cathode load impedance being of a magnitude relative to the potential at said suppressor grid normally to prevent anode current flow, means for coupling a negative trigger to said control grid to decrease the magnitude of screen grid current flowing through said cathode load impedance to reduce the potential at said cathode to a degree to render said cathode sufficiently negative with respect to said suppressor grid to initiate anode current flow.

10. An electron tube circuit comprising, an electron tube having at least an anode, a suppressor grid, a screen grid, a control grid and a cathode, a reference potential point, a source of potential positive with respect to said reference point, an anode load impedance coupling said anode to said positive potential source, a cathode load impedance connecting said cathode to said reference point, means for biasing said screen and suppressor grids to normally allow screen grid current flow, the magnitude of the potential generated at said cathode by virtue of said screen grid current flow therethrough being related to the potential at said suppressor grid to normally prevent anode current flow, a grid resistor coupling said control grid to said positive potential source, a capacitor coupling said anode to said control grid, means including said capacitor for periodically coupling a negative pulse to said control grid to periodically reduce the magnitude of said screen grid current and said potential at said cathode, said reduced cathode potential being of a magnitude relative to that at said suppressor grid to initiate anode current flow, said capacitor charging during normal screen grid current flow and discharging through said grid resistor during anode current flow to produce a drop in anode potential linearly with time.

11. Apparatus as in claim 10 and means including said capacitor for periodically coupling a positive pulse to said control grid to periodically terminate anode current flow in said tube by increasing the potential at said cathode to said magnitude relative to said suppressor grid potential to normally prevent anode current flow.

12. Apparatus as in claim 10 and means including said capacitor for periodically coupling one of a series of positive pulses occurring at a repetition frequency which is a multiple of the repetition frequency of said negative pulses to said control grid during each interval between successive negative pulses, said one positive pulse terminating said anode current flow in said tube by increasing the potential at said cathode to said magnitude relative to said suppressor grid potential to normally prevent anode current flow, said one pulse being coupled to said control grid at a time when said anode potential is less than that of said timing pulses.

13. An electrical circuit comprising, a generator adapted to generate a signal having a wave form which decreases linearly from a first magnitude to a second magnitude and having a first repetition frequency, a source of direct potential, means for superimposing on said direct potential a series of constant amplitude timing pulses having a repetition rate which is a multiple of said first repetition rate and synchronized with said signal, means for adjusting the magnitude of said direct potential, and means connecting said superimposing means to said generator and arranged whereby one of said timing pulses is coupled to said generator when the peak amplitude of said one pulse exceeds the amplitude of said linearly decreasing signal, said generator being arranged to produce an output pulse in response to and coincidentally with said one timing pulse, whereby said output pulses have a repetition rate equal to the repetition rate of said signal and a phase relative to said signal dependent upon the adjusted level of said direct potential.

14. An electrical circuit comprising, a generator adapted to generate a periodic signal having a wave form which decreases linearly with time from a first to a second magnitude during each period thereof, a source of direct potential, means for adjusting the level of said direct potential, means for superimposing on said direct potential a series of constant amplitude timing pulses synchronized with said signal and having a repetition frequency which is a multiple of the repetition frequency of said signal, means connecting said superimposing means to said generator, said generator being so constructed that the slope of said signal during the linearly decreasing portion thereof is so related to the peak amplitude of said superimposed pulses that the slope line of said signal intersects a timing pulse independently of the level of said direct potential, said generator being arranged to produce an output pulse upon intersection of said linearly decreasing signal with said timing pulse, whereby said output pulses have a repetition frequency equal to the repetition rate of said signal and a phase relative to said signal dependent upon the adjusted level of said direct potential.

15. An electrical circuit comprising, means for generating a first signal at a first repetition frequency, means for coupling timing pulses to said generator, said timing pulses being synchronized with said first signal and having a pulse repetition rate that is a multiple of said first repetition frequency, said signal generator being responsive to one of said timing pulses during each period of said first signal for generating an output pulse at said first repetition frequency, each of said output pulses being substantially in time coincidence with said one of said timing pulses, and means operatively associated with said generator for controlling the phase of said output pulses in steps equal to the period of said timing pulses.

ROGER B. WOODBURY.

REFERENCES CITED

The following references are of record in the file of this patent:

UNITED STATES PATENTS

| Number | Name | Date |
|---|---|---|
| 2,284,337 | Mulert | May 26, 1942 |
| 2,412,485 | Whiteley | Dec. 10, 1946 |